(12) United States Patent
Jiang et al.

(10) Patent No.: US 12,393,502 B2
(45) Date of Patent: Aug. 19, 2025

(54) METHOD, DEVICE, AND COMPUTER PROGRAM PRODUCT FOR PROCESSING LOGS

(71) Applicant: Dell Products L.P., Round Rock, TX (US)

(72) Inventors: Changxu Jiang, Chengdu (CN); Shuang Zheng, Chengdu (CN); Bo Hu, Chengdu (CN); Ling Yan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 96 days.

(21) Appl. No.: 18/343,838

(22) Filed: Jun. 29, 2023

(65) Prior Publication Data
US 2024/0411665 A1 Dec. 12, 2024

(30) Foreign Application Priority Data
Jun. 7, 2023 (CN) .......................... 202310673334.4

(51) Int. Cl.
*G06F 11/34* (2006.01)
*G06F 11/30* (2006.01)

(52) U.S. Cl.
CPC ...... *G06F 11/3476* (2013.01); *G06F 11/3086* (2013.01)

(58) Field of Classification Search
CPC .......................... G06F 11/1453; G06F 11/3476
See application file for complete search history.

(56) References Cited

U.S. PATENT DOCUMENTS

| | | | |
|---|---|---|---|
| 2012/0246303 A1* | 9/2012 | Petersen | G06F 16/1734 709/224 |
| 2013/0073526 A1* | 3/2013 | Deluca | G06F 11/3612 707/E17.009 |

(Continued)

OTHER PUBLICATIONS

A. Oliner et al., "What Supercomputers Say: A Study of Five System Logs," 37th Annual IEEE/IFIP International Conference on Dependable Systems and Networks, Jun. 2007, 10 pages.

(Continued)

*Primary Examiner* — Michael Maskulinski
(74) *Attorney, Agent, or Firm* — Ryan, Mason & Lewis, LLP

(57) ABSTRACT

Embodiments of the present disclosure relate to a method, a device, and a computer program product for processing logs. The method includes determining, based on a duration of a predetermined number of log entries recently recorded by a log recording component, a target log recording component from a group of candidate log recording components. The method further includes determining, based on a predetermined number of log entries recently recorded by the target log recording component, a log group including a plurality of similar log entries. The method further includes determining a duplicate content among the plurality of log entries in the log group and a distinctive content for each of the plurality of log entries. The method further includes updating the plurality of log entries by de-duplicating the duplicate content and retaining the distinctive content for each of the plurality of log entries.

20 Claims, 9 Drawing Sheets

(56) References Cited

U.S. PATENT DOCUMENTS

| | | | | |
|---|---|---|---|---|
| 2014/0344622 A1* | 11/2014 | Huang | ............... | G06F 11/0775 |
| | | | | 714/37 |
| 2019/0108112 A1* | 4/2019 | Kannan | ............... | G06F 11/3476 |
| 2024/0330143 A1* | 10/2024 | Prasad | ............... | G06F 11/3476 |

OTHER PUBLICATIONS

P. He et al., "Drain: An Online Log Parsing Approach with Fixed Depth Tree," IEEE 24th International Conference on Web Services, Jun. 2017, pp. 33-40.

Grafana Labs, "Grafana Loki," https://grafana.com/oss/loki/, Accessed Jun. 28, 2023, 14 pages.

J. Wang et al., "LogEvent2vec: LogEvent-to-Vector Based Anomaly Detection for Large-Scale Logs in Internet of Things," Sensors, vol. 20, No. 9, Apr. 26, 2020, 19 pages.

* cited by examiner

METHOD, DEVICE, AND COMPUTER PROGRAM PRODUCT FOR PROCESSING LOGS

RELATED APPLICATION

The present application claims priority to Chinese Patent Application No. 202310673334.4, filed Jun. 7, 2023, and entitled "Method, Device, and Computer Program Product for Processing Logs," which is incorporated by reference herein in its entirety.

FIELD

Embodiments of the present disclosure generally relate to the field of data processing, in particular to a method, a device, and a computer program product for processing logs.

BACKGROUND

In a development process of a computer technology, in order to understand operations performed by hardware or software systems, the hardware and software systems typically record log files. The log files store many log entries for recording the operations performed in the hardware or software systems. For the log entries, they are permanently stored as a series of labels and data in the log files. When recording the log entries, a logging mechanism typically implicitly adds some tags/values as trusted fields, while other contents of the log entries are defined by a log recording component.

When the log recording component, such as a hardware or software system, records the log entries in the log files, certain log data recorded in the log files is redundant and/or duplicate. Especially when there is a problem in the log recording component, the recorded log entries typically contain a large amount of irrelevant duplicate contents.

SUMMARY

Embodiments of the present disclosure provide a method, a device, and a computer program product for processing logs.

According to a first aspect of the present disclosure, a method for processing logs is provided. The method includes determining, based on a duration of a predetermined number of log entries recently recorded by a log recording component, a target log recording component from a group of candidate log recording components. The method further includes determining, based on a predetermined number of log entries recently recorded by the target log recording component, a log group including a plurality of similar log entries. The method further includes determining a duplicate content among the plurality of log entries in the log group and a distinctive content for each of the plurality of log entries. The method further includes updating the plurality of log entries by de-duplicating the duplicate content and retaining the distinctive content for each of the plurality of log entries.

According to a second aspect of the present disclosure, an electronic device is provided. The electronic device includes at least one processor; and a memory, coupled to the at least one processor and having instructions stored thereon, wherein the instructions, when executed by the at least one processor, cause the electronic device to execute actions including: determining, based on a duration of a predetermined number of log entries recently recorded by a log recording component, a target log recording component from a group of candidate log recording components; determining, based on a predetermined number of log entries recently recorded by the target log recording component, a log group including a plurality of similar log entries; determining a duplicate content among the plurality of log entries in the log group and a distinctive content for each of the plurality of log entries; and updating the plurality of log entries by de-duplicating the duplicate content and retaining the distinctive content for each of the plurality of log entries.

According to a third aspect of the present disclosure, a computer program product is provided. The computer program product is tangibly stored on a non-transitory computer-readable medium and includes machine-executable instructions, wherein the machine-executable instructions, when executed by a machine, cause the machine to perform steps of the method in the first aspect of the present disclosure.

BRIEF DESCRIPTION OF THE DRAWINGS

By further description of exemplary embodiments of the present disclosure, provided herein with reference to the accompanying drawings, the above and other objectives, features, and advantages of the present disclosure will become more apparent, wherein identical reference numerals generally represent identical components in the exemplary embodiments of the present disclosure.

In each accompanying drawing, identical or corresponding numerals represent identical or corresponding parts.

DETAILED DESCRIPTION

Figure 1:
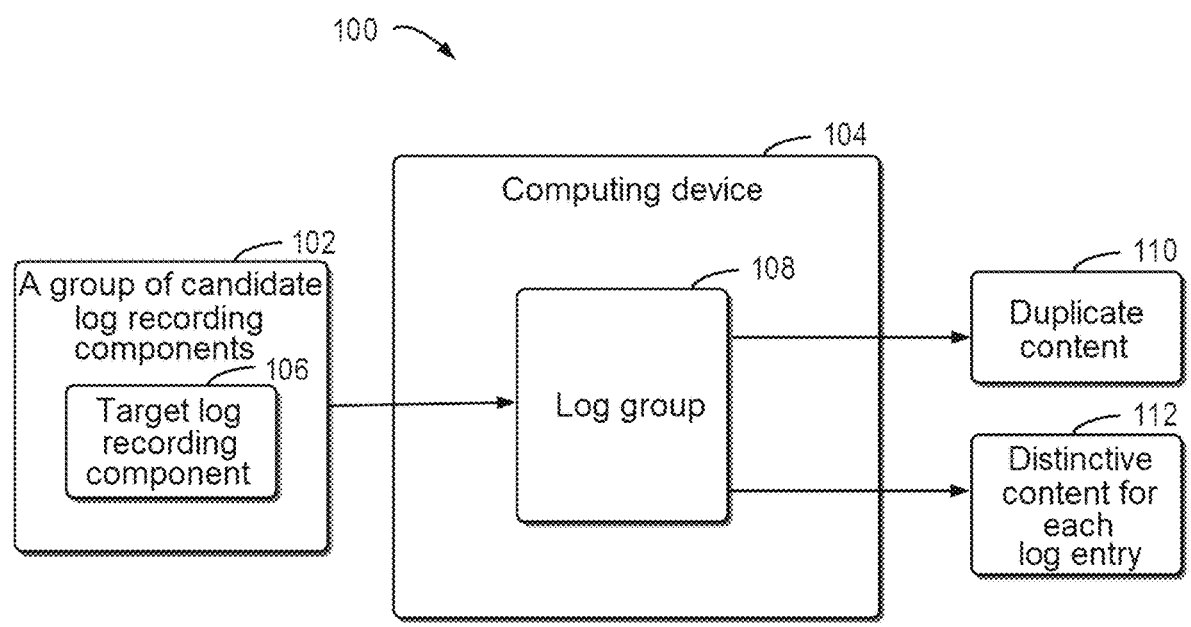
FIG. 1 is a schematic diagram of an example environment in which a device and/or a method according to an embodiment of the present disclosure can be implemented.

The following will describe illustrative embodiments of the present disclosure in more detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As mentioned above, certain log data recorded in files is redundant and/or duplicate, and contains irrelevant duplicate contents. Due to a limited space available for storing logs, in some cases, when analyzing critical issues, failure to find critical messages due to log coverage/refresh occurs repeatedly. Redundant and repetitive recording of certain log data may occupy excess space, resulting in log scrolling or overlapping, especially in a case of abnormal system operation. A conventional solution is to adjust a log recording component, such as a software system, to avoid duplicate log recording. However, for a large software system, it is difficult to solve all error processing code paths and ensure that each component does not loop endlessly to avoid constant log recording. In addition, the sizes of log files are large, and the log volume is large, which also increases the workload of analysis engineers.

At least to solve the above and other potential problems, an embodiment of the present disclosure provides a method for processing logs. In the method, a computing device determines, based on a duration of a predetermined number of log entries recently recorded by a log recording component, a target log recording component from a group of candidate log recording components. Then, the computing device determines, based on a predetermined number of log entries recently recorded by the target log recording component, a log group including a plurality of similar log entries. Next, the computing device determines a duplicate content among the plurality of log entries in the log group and a distinctive content for each of the plurality of log entries. Finally, the computing device updates the plurality of log entries by de-duplicating the duplicate content and retaining the distinctive content for each of the plurality of log entries. Through the method, which log recording component needs to be processed may be quickly and accurately determined, the amount of stored data and required storage resources are reduced by de-duplicating the duplicate content, and the resource utilization rate is improved.

Illustrative embodiments of the present disclosure will be further described in detail below with reference to the accompanying drawings, wherein FIG. 1 shows an example environment in which a device and/or a method according to an embodiment of the present disclosure can be implemented. As shown in FIG. 1, the example environment 100 includes a computing device 104, and the computing device 104 is configured to find one or more target log recording components 106 that may have log recording anomalies from a group of candidate log recording components 102. Then, log entries of the target log recording component 106 are analyzed to process and adjust the log entries with high similarity.

The example computing device 104 includes, but is not limited to, a personal computer, a server computer, a handheld or laptop device, a mobile device, a multiprocessor system, a consumer electronic product, a minicomputer, a mainframe computer, a distributed computing environment including any of the above systems or devices, and the like.

The group of candidate log recording components 102 shown in FIG. 1 may be any suitable hardware component or software system, and they will record operations they perform in their own log files while performing the operations. It is shown in FIG. 1 that the group of candidate log recording components 102 is located outside the computing device 104, which is only an example, rather than a specific limitation to the present disclosure. The group of candidate log recording components 102 may also be located in the computing device 104, or a part of the group of candidate log recording components 102 may be located in the computing device 104, and the other part of the log recording components 102 may be located outside the computing device 104.

The computing device 104 queries or analyzes the log recording components in the group of candidate log recording components 102, to determine whether the log recording components are the target log recording components 106 that may have log recording anomalies. In some embodiments, the computing device 104 queries and analyzes each log recording component in the group of candidate log recording components 102 at a predetermined interval. In some embodiments, the computing device 104 may also analyze different log recording components at different time intervals. In some embodiments, the computing device may query or analyze the log recording components in the group of candidate log recording components 102 at multiple predetermined moments. The above examples are only used for describing the present disclosure, and are not intended to specifically limit the present disclosure.

After determining the target log recording component 106, the computing device 104 may analyze a predetermined number of log entries recently generated by the target log recording component. For example, K log entries recently recorded by the target log recording component are acquired, and then the K log entries are processed. The computing device 104 analyzes the acquired K log entries recently recorded according to the similarity among the logs, and then groups them to group the K log entries into one or more log groups 108. For the log entries in the log group 108, there is a high similarity among them.

Then, the computing device 104 further processes the log group 108, so as to determine a duplicate content 110 among the log entries in the log group 108 and a distinctive content 112 for each log entry in the log group 108. Then, the duplicate content is de-duplicated, only one duplicate content is retained, and the distinctive content for each log entry is retained. Then, the retained duplicate content and distinctive content for each log entry are used to replace the plurality of logs in the log group, and they are stored.

Through the method, which log recording component needs to be processed may be quickly and accurately determined, the amount of stored data and required storage resources are reduced by de-duplicating the duplicate content, and the resource utilization rate is improved.

Figure 2:
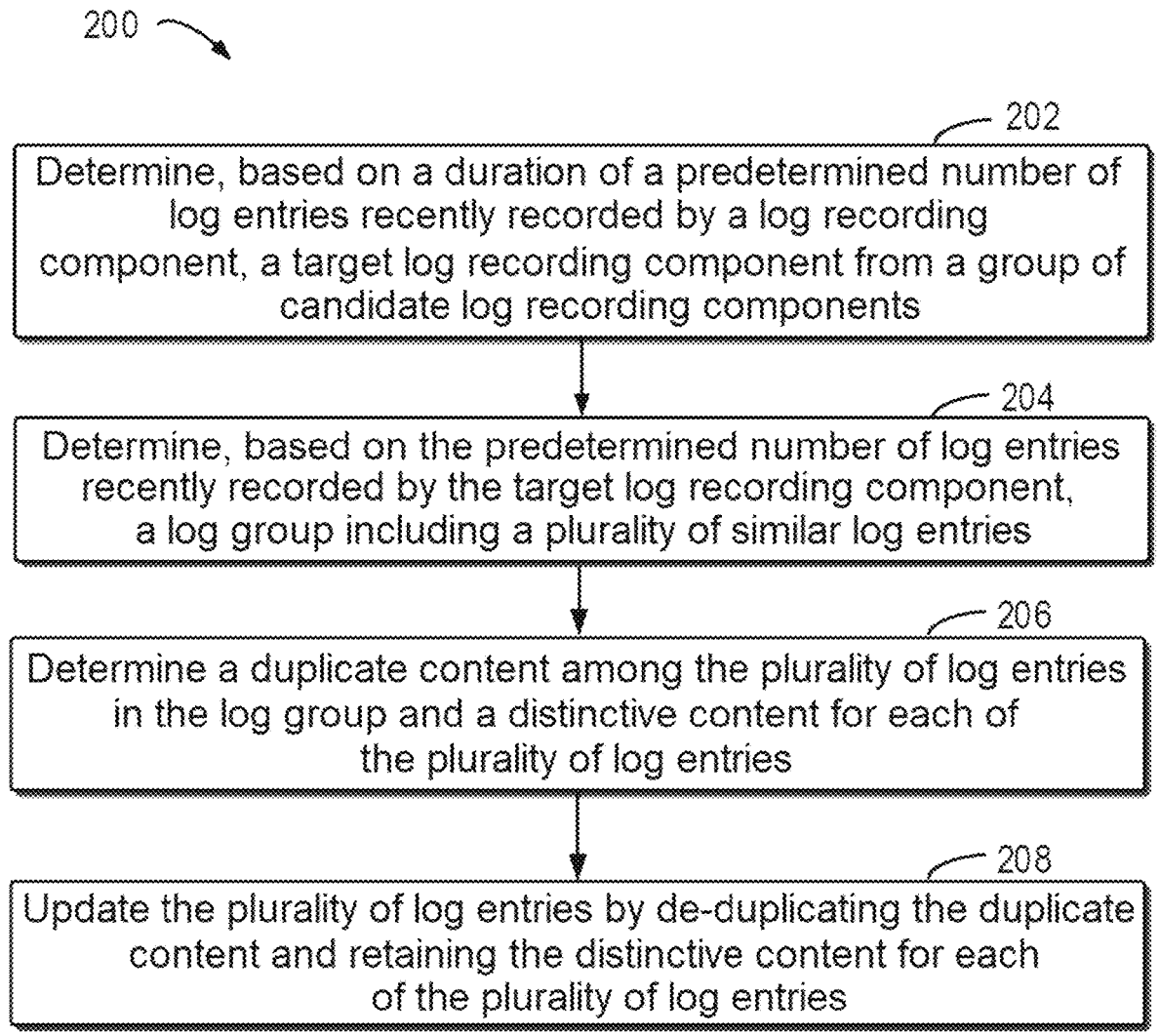
FIG. 2 is a flow chart of a method for processing logs according to an embodiment of the present disclosure.

The example environment in which the device and/or a method according to embodiments of the present disclosure can be implemented has been described above in conjunction with FIG. 1. A flow chart of a method 200 for processing logs according to an embodiment of the present disclosure is described below in conjunction with FIG. 2. The method 200 may be performed on the computing device 104 in FIG. 1 or any suitable computing device.

At block 202, a target log recording component is determined from a group of candidate log recording components based on a duration of a predetermined number of log entries recently recorded by a log recording component. For example, the computing device 104 determines, according to a duration of a predetermined number of log entries recently recorded by each candidate log recording component in the group of candidate log recording components, whether the candidate log recording component is the target log recording component.

In some embodiments, the computing device 104 selects one candidate log recording component from the group of candidate log recording components. Then, the computing device 104 acquires a predetermined number of log entries recently recorded by the candidate log recording component. The computing device 104 may determine a duration of a time period for generating the predetermined number of log entries according to the predetermined number of log entries. Then, it is determined whether the duration is greater than a threshold duration. If it is determined that the duration is greater than the threshold duration, the computing device 104 will determine that the candidate log recording component is not the target log recording component that may have log recording anomalies. At this time, its recorded log entries are not processed, and the log entries of the candidate log recording component are stored according to an original strategy. If it is determined that the duration is smaller than or equal to the threshold duration, the computing device 104 determines the candidate log recording component as the target log recording component that may have the log recording anomalies.

In some embodiments, when the duration of the time period corresponding to the predetermined number of log entries is determined, since the log entries are all arranged in order, the computing device 104 first determines a first log entry from the predetermined number of log entries, and then acquires a timestamp of the log entry. Next, a timestamp of a last log entry in the predetermined number of log entries is determined. A duration of a time period where the predetermined number of log entries are located is determined through the timestamp of the first log entry in the predetermined number of log entries and the timestamp of the last log entry in the predetermined number of log entries.

Figure 3:
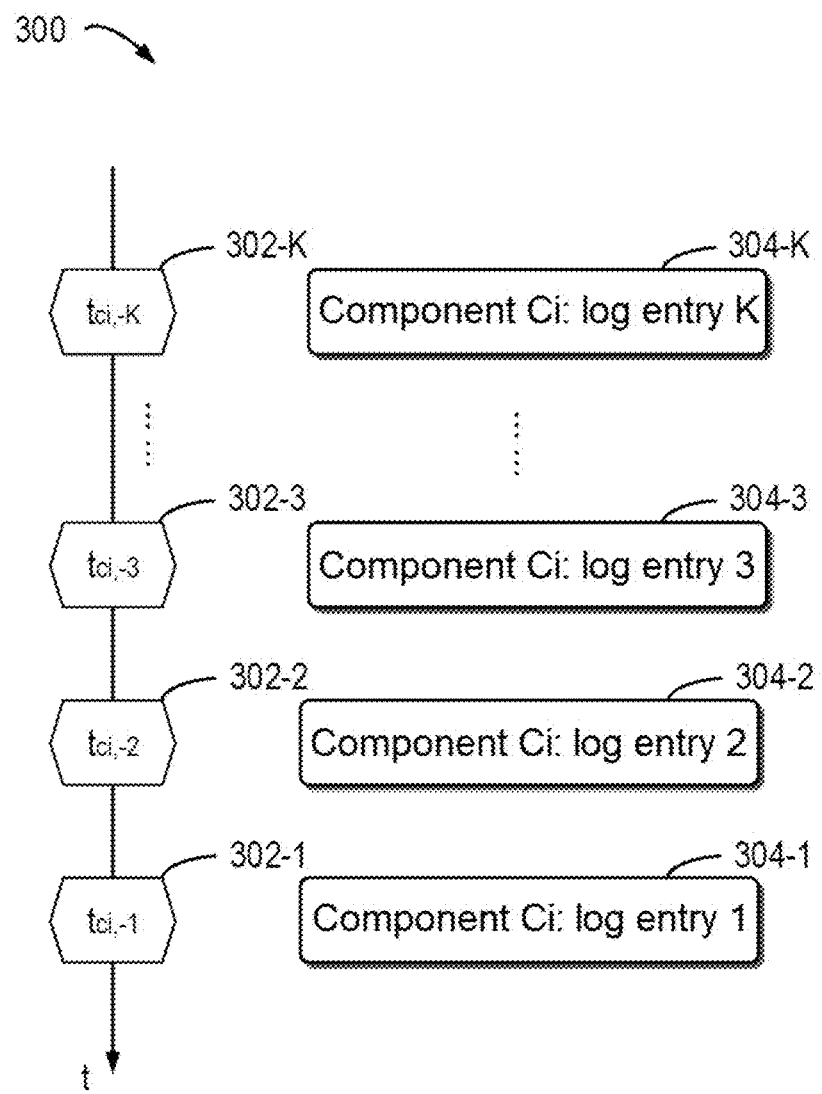
FIG. 3 is a schematic diagram of a plurality of log entries of a component according to an embodiment of the present disclosure.

For example, FIG. 3 shows a schematic diagram 300 of a plurality of log entries of a log recording component Ci according to an embodiment of the present disclosure. In FIG. 3, K time points $t_{ci,-1}$ 302-1, $t_{ci,-2}$ 302-2, $t_{ci,-3}$ 302-3 . . . and $t_{ci,-K}$ 302-K before a current time point t are shown, where K is a positive integer. For the log recording component Ci, there are corresponding log entries recorded by the component Ci at the K time points, such as a log entry 1 304-1, a log entry 2 304-2, a log entry 3 304-3, and a log entry K 304-K. Durations of time periods corresponding to the latest K log entries of the log recording component Ci are $t_{ci,-1}$-$t_{ci,-K}$, which may be used to determine whether the component Ci is the target log recording component that may have the log recording anomalies.

Now, returning to FIG. 2 for further description, in some embodiments, the computing device 104 typically determines the target log recording component from a group of candidate log recording components at a predetermined interval. In some embodiments, the computing device 104 may determine the target log recording component from the group of candidate log recording components at multiple predetermined moments. Optionally or additionally, when the computing device determines whether each candidate log recording component in the group of candidate log recording components is the target log recording component, for different log recording components, their determining moments are different. The above examples are only used for describing the present disclosure, and are not intended to specifically limit the present disclosure.

At block 204, a log group including a plurality of similar log entries is determined based on a predetermined number of log entries recently recorded by the target log recording component. For example, in FIG. 1, the computing device 104 analyzes and processes the predetermined number of log entries recently recorded by the target log recording component 106 to determine the log group including the plurality of similar log entries.

In some embodiments, when the log group including the plurality of similar log entries is determined, the computing device 104 first acquires the predetermined number of log entries recently recorded by the target log recording component. Then, the computing device 104 may determine the similarity among the log entries. Then, the computing device 104 groups the predetermined number of log entries according to the similarity among the log entries to determine one or more log groups.

In some embodiments, the predetermined number of log entries are determined as a log set. When the log group is determined from the predetermined number of log entries by using the similarity among the log entries, the computing device may recursively perform the following operations. First, the computing device determines the number of the log entries in the log set. Then, whether the number is greater than a threshold number is determined, for example, the threshold number is 2. If it is determined that the number is smaller than the threshold number, it indicates that the number of the log entries in the log set is small, and there is no need for further grouping. If it is determined that the number is greater than the threshold number, it indicates that there are a plurality of log entries in the log set, and therefore, they may be further grouped. At this time, a log entry is selected from the log set as a reference log entry. Then, the reference log entry is adopted to initialize the log group, and the log set is updated by removing the reference log entry from the log set. Then, the computing device 104 determines a similarity between each log entry in the updated log set and the reference log entry. If it is determined that the similarity exceeds a similarity threshold, the log entries in the updated log set are added into the log group, and the log entry is removed from the log set to further update the log set. If the similarity does not exceed the similarity threshold, it indicates that two log entries are not similar and are not processed, so as to continue to be retained in the log set. Then, the log set after the above operation is repeatedly subjected to the above operation until the log set is grouped completely.

In some embodiments, when the similarity between each log entry in the updated log set and the reference log entry is determined, the computing device 104 may first remove the timestamps of the log entries and of the reference log entry to generate adjusted log entries and an adjusted reference log entry. Then, the computing device 104 will determine the similarity between each adjusted log entry and the adjusted reference log entry as the similarity between the log entries and the reference log entry.

At block 206, a duplicate content among the plurality of log entries in the log group and a distinctive content for each of the plurality of log entries are determined. For example, the computing device 104 determines the duplicate content 110 among the plurality of log entries in the log group 108 and the distinctive content 112 for each of the plurality of log entries in the log group 108.

In some embodiments, when the duplicate content among the plurality of log entries in the log group and the distinctive content for each of the plurality of log entries are determined, the computing device first compares the plurality of log entries, and determines the duplicate content by comparing. Then, the computing device determines a content in each log entry, except for the duplicate content, as the distinctive content for the log entry. In some embodiments, the computing device 104 may use various suitable algorithms to process the plurality of log entries in the log group, so as to determine the duplicate content and the distinctive content for different log entries. The above examples are only used for describing the present disclosure, and are not intended to specifically limit the present disclosure.

At block 208, the plurality of log entries are updated by de-duplicating the duplicate content and retaining the distinctive content for each of the plurality of log entries. For example, the computing device 104 updates the plurality of log entries by de-duplicating the duplicate content and retaining the distinctive content for each of the plurality of log entries. Then, the de-duplicated duplicate content and the distinctive content for each log entry are stored to replace the plurality of log entries in the log group.

In some embodiments, the plurality of log entries may be displayed further through the duplicate content of the plurality of log entries in the log group and the distinctive content for each log entry. If it is determined that the plurality of log entries are displayed, the computing device combines the duplicate content with the distinctive content for each of the plurality of log entries respectively to generate the plurality of log entries. Then, the plurality of log entries are displayed.

In some embodiments, the computing device may provide optional display formats for users, such as a hidden format and other formats. Therefore, the computing device first determines the display format of the plurality of log entries when displaying logs. If it is determined that the display format is the hidden format, the computing device only displays the duplicate content and the distinctive content for each of the plurality of log entries. If it is determined that the display format is not the hidden format, the plurality of log entries are generated by combining the duplicate content with the distinctive content for each log entry in the plurality of log entries respectively. Then, the plurality of log entries are displayed.

Through the method, which log recording component needs to be processed may be quickly and accurately determined, the amount of stored data and required storage resources are reduced by de-duplicating the duplicate content, and the resource utilization rate is improved.

The flow chart of the method for processing logs according to embodiments of the present disclosure has been described above with reference to FIGS. 2 and 3. An example for processing log data according to an embodiment of the present disclosure will be described below with reference to FIGS. 4 and 5. In this example, an event trigger and analyze module and a similarity check and merge (SCM) module are used. The event trigger and analyze module analyzes a log state of each component and recognizes abnormal log recording components. Specifically, the event trigger and analyze module triggers a component log merge (CLM) event by tracking recorded log entries when certain conditions are met. Next, the SCM module adaptively merges/de-duplicates the log entries of the log recording component.

Figure 4:
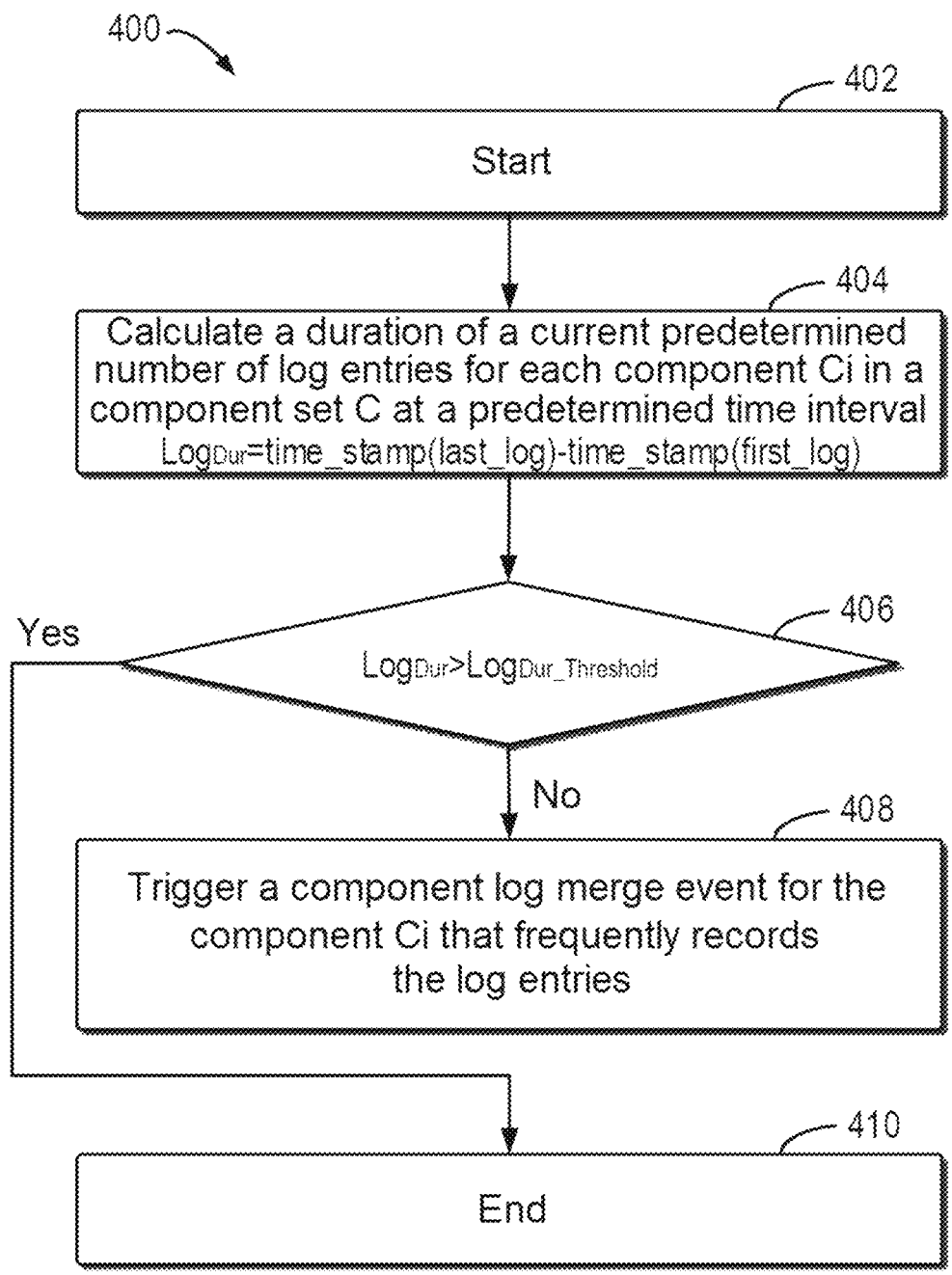
FIG. 4 is a schematic diagram of an example process for triggering a log merge event of a component according to an embodiment of the present disclosure.

An execution process of the event trigger and analyze module may refer to an example process 400 for triggering a log merge event of the component shown in FIG. 4. The example process 400 in FIG. 4 may be executed on the computing device 104 in FIG. 1 or any appropriate computing device.

The example process 400 starts at block 402, and then proceeds to block 404 where the computing device calculates a duration $Log_{dur}$=time_stamp(last_log)–time_stamp(first_log) of a current predetermined number of log entries for an $i^{th}$ component Ci in a component set C at a predetermined time interval $T_{interval}$, where $T_{interval}$ is used for checking whether the time interval for triggering the CLM event is met; $Log_{Dur}$ is a variable, which represents a duration of a time period where a predetermined number of logs in a current log are located; last_log represents the last log entry in the predetermined number of log entries; first_log represents the first log entry in the predetermined number of log entries; and the component set C may represent a log recording component list, where C=[C1, C2, . . . , CN]. N represents the number of the log recording components, and 1≤i≤N. Next, at block 406, it is determined whether $Log_{dur}$>$Log_{DurThreshold}$ is valid, where $Log_{DurThreshold}$ is used for checking whether a duration threshold of the CLM event is triggered. In some embodiments, $Log_{Dur}$ is an element in D, D=[d1, d2, d3, . . . , dN], where di=t–$t_{ci,-K}$ is a time interval between a current time point t and a time point $t_{ci,-K}$ of the last K messages from the component Ci, and K represents the number of log entries for calculating the duration D. If the component Ci has no message K, then $t_{ci,-K}$=0.

If $Log_{dur}$ is greater than $Log_{DurThreshold}$, the operation ends at block 410; and if $Log_{dur}$ is not greater than $Log_{DurThreshold}$, at block 408, the CLM event for the component Ci that frequently records the log entries is triggered. M is a set of to-be-processed log recording components that may have log recording anomalies, and when the CLM event is triggered, a component will be added to M. Optionally or additionally, a component corresponding to an element with a minimum value in the set D may be determined as the target log recording component that may have the log recording anomalies. For example, M=M.append(Cj), where M.append( ) represents an added function, and $$j = \arg \cdot (\text{Min}(D)) = \arg \cdot \left( \underset{i \in (1, N)}{\text{Min}} (di) \right),$$

where arg.(Min(D)) represents a subscript of the element with the minimum value in the set D; and Min ( ) means taking the minimum value. The above examples are only used for describing the present disclosure, and are not intended to specifically limit the present disclosure.

For the target log recording component that may fail, considering that similar logs are generated cyclically, a log entry merge operation may be created for the latest K log entries in the target log recording component. An SCM algorithm is applied to adaptively delete repeated contents in the K log entries. In this process, similar log entries are divided into several groups first, and then the duplicate content in each group is de-duplicated.

Figure 5:
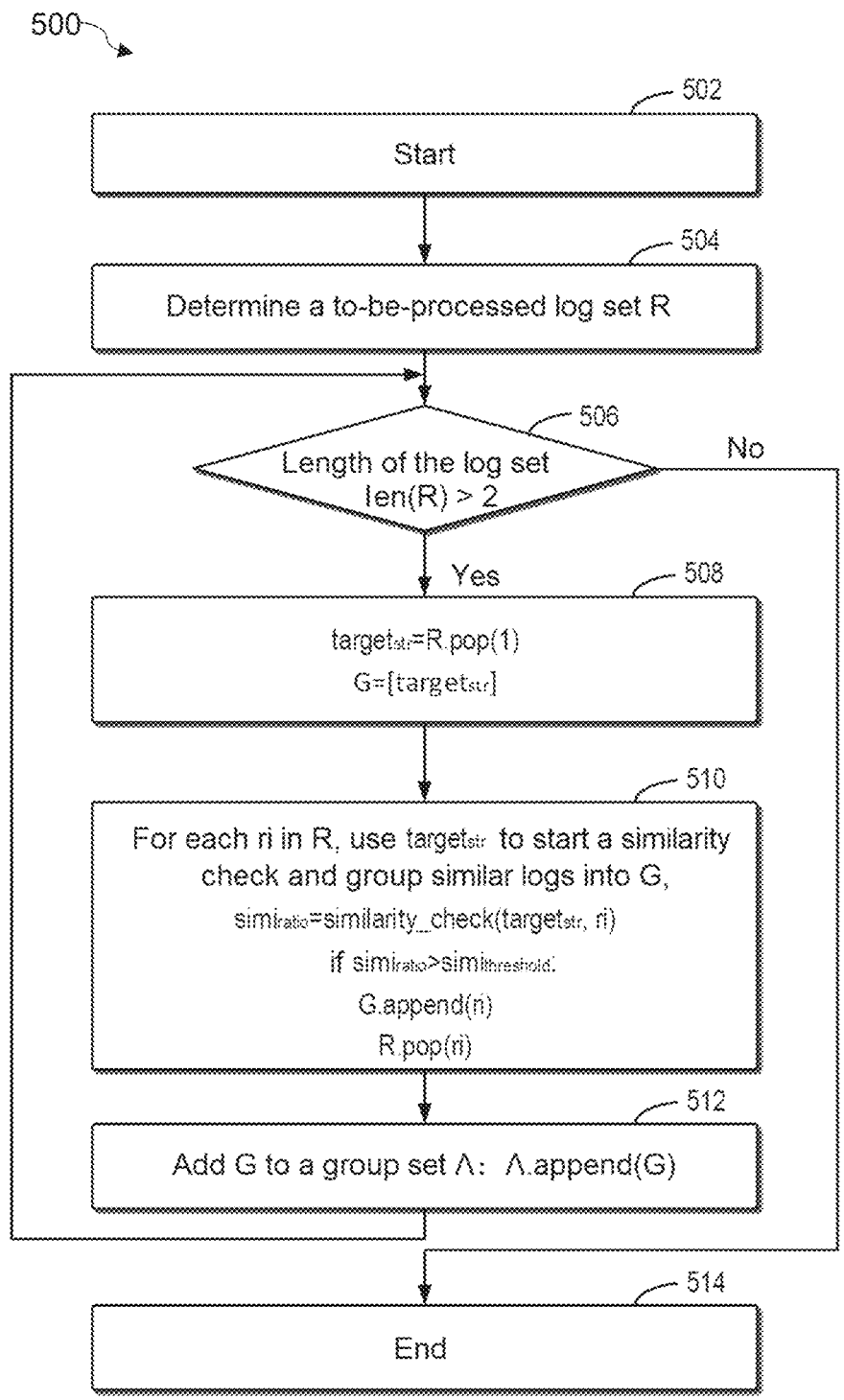
FIG. 5 is a schematic diagram of an example process for grouping a plurality of log entries according to an embodiment of the present disclosure.

An example process 500 of grouping is described below with reference to FIG. 5. As shown in FIG. 5, the example process 500 starts at block 502, and then determines a to-be-processed log set R at block 504, where R represents a group of to-be-processed log entries of the target log recording component, where R=[r1, r2, . . . , rK], and ri is the latest $i^{th}$ message when receiving the CLM event. The timestamp of each message is used as a fingerprint of each message. At block 506, whether a length of the log set R len(R)>2 is valid is checked. If len(R)>2 is invalid, the operation ends at block 514. If len(R)>2, the process moves to block 508, in which operations $target_{str}$=R.pop(1) and G=[$target_{str}$] are executed, where R.pop( ) represents that one log entry is popped up from the set R as a target character string $target_{str}$, which typically may be the latest log entry in R, and G=[$target_{str}$] represents that G is initialized by using the target character string $target_{str}$. Then at block 510, for each ri in R, $target_{str}$ is used to start a similarity check and group similar logs into G, and in this process, $simi_{ratio}$=similarity_check($target_{str}$, ri) is calculated first, where $simi_{ratio}$ is a variable, which represents a similarity ratio result of comparing two message character strings; and similarity_check( ) is used to compare two character strings to obtain a similarity. If $simi_{ratio}$>$simi_{threshold}$, operations G.append(ri) and R.pop(ri) are executed, G.append( ) represents adding a log entry into G, and R.pop( ) represents popping up the log entries in R, where $simi_{Threshold}$ is a threshold for judging whether messages are classified into a class group. G represents a group of log entries having similar contents, and the duplicate content in the group of log entries will be de-duplicated. At block 512, G is added to a group set Λ:Λ.append(G), where/represents a group set after grouping the similar messages for de-duplicating the contents, and G stores a group of log entries most similar to $target_{str}$. For each log entry in each G, the duplicate content is de-duplicated, which means only one copy of the duplicate content needs to be stored, so that the space required for log messages is reduced. After the operation in block 512 is completed, remaining log entries in the group G may continue to be grouped.

Figure 6:
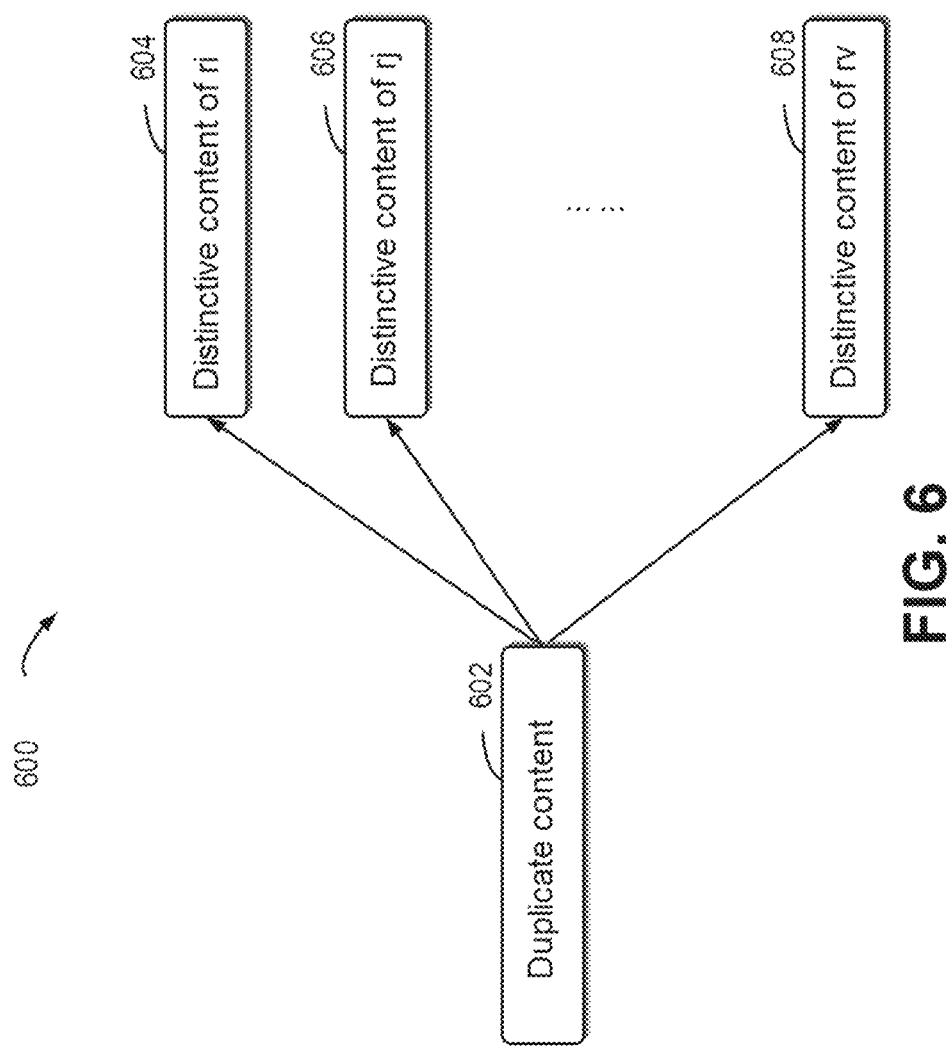
FIG. 6 is a schematic diagram of an example for a duplicate content of the plurality of log entries and an example for a distinctive content for each log entry according to an embodiment of the present disclosure.

In some embodiments, each log entry ri may be retrieved by connecting the duplicate content and distinctive content of ri. FIG. 6 shows a schematic diagram of an example of a duplicate content and an example of distinctive contents for the log entries according to an embodiment of the present disclosure. An example 600 records the generation of a duplicate content 602 for a log group and a distinctive content for each log entry for a group of log entries after the above operations, such as a distinctive content 604 for ri, a distinctive content 606 for rj, and a distinctive content 608 for rv.

Through the method, the duplicate content may be de-duplicated, so that the amount of log data that needs to be stored and required storage resources are reduced, and the resource utilization rate is improved.

After performing SCM, an optional function "hidden" may be implemented to hide the duplicate content. After selecting the function, the duplicate content may only be displayed once to simplify the log display. After selecting hidden display, the size of a displayed log file may be reduced because the duplicate content may not be retrieved. It avoids displaying a large amount of the duplicate information. Analysts may easily open clean log files and search for key information.

Figure 7:
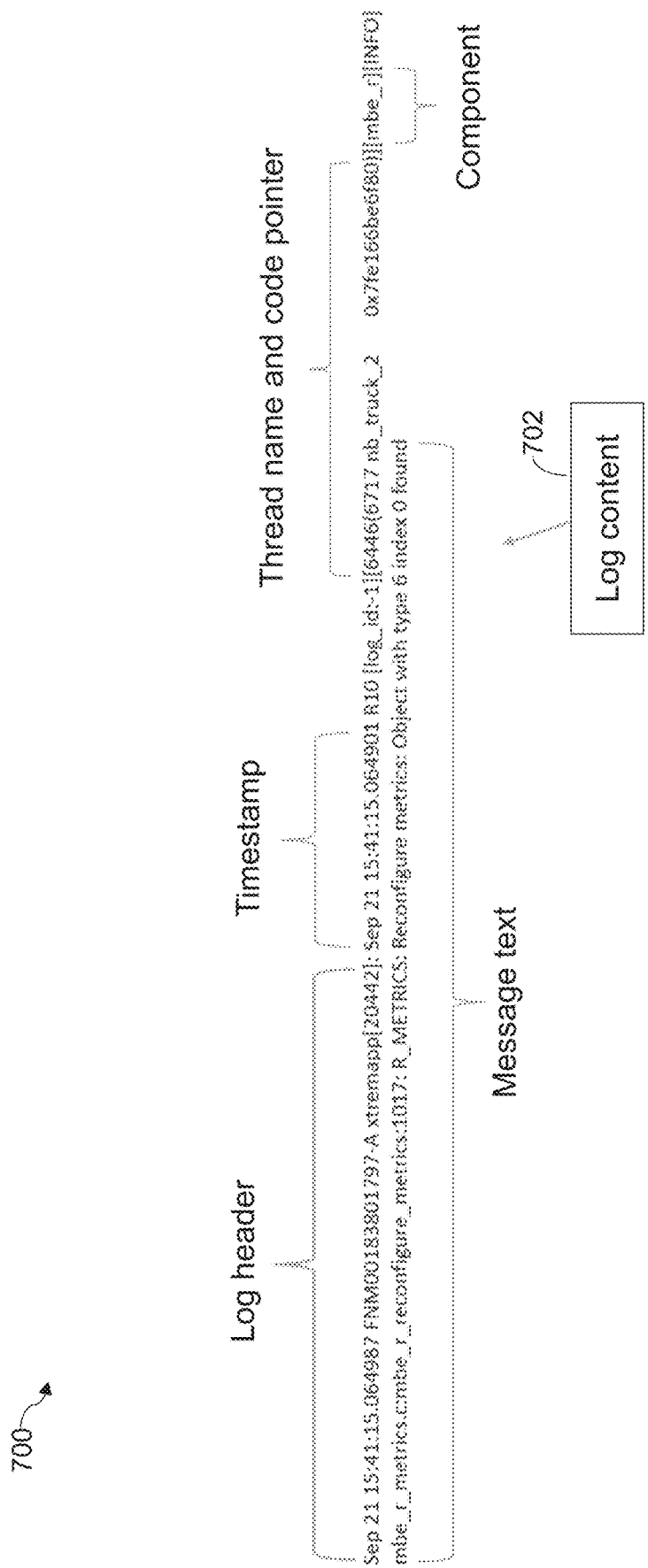
FIG. 7 is a schematic diagram of an example of a log entry according to an embodiment of the present disclosure.

FIG. 7 is a schematic diagram 700 of an example of a log entry according to an embodiment of the present disclosure. A log entry in FIG. 7 includes a log header and a log content 702. The log header is added by a log recording mechanism, the log content 702 is generated by a log recording component, and includes some metadata recorded by the log recording component, such as a timestamp, a thread name and code pointer, a component identifier, and message text, where the timestamp may be a unique identifier of a log entry. For example, the timestamp indicates the time when the log recording component records a log, the thread name and code pointer is used to identify a thread and code targeted by the log, the component identifier is used to identify the log recording component, and the message text is a distinctive content of a recorded operation.

Figure 8:
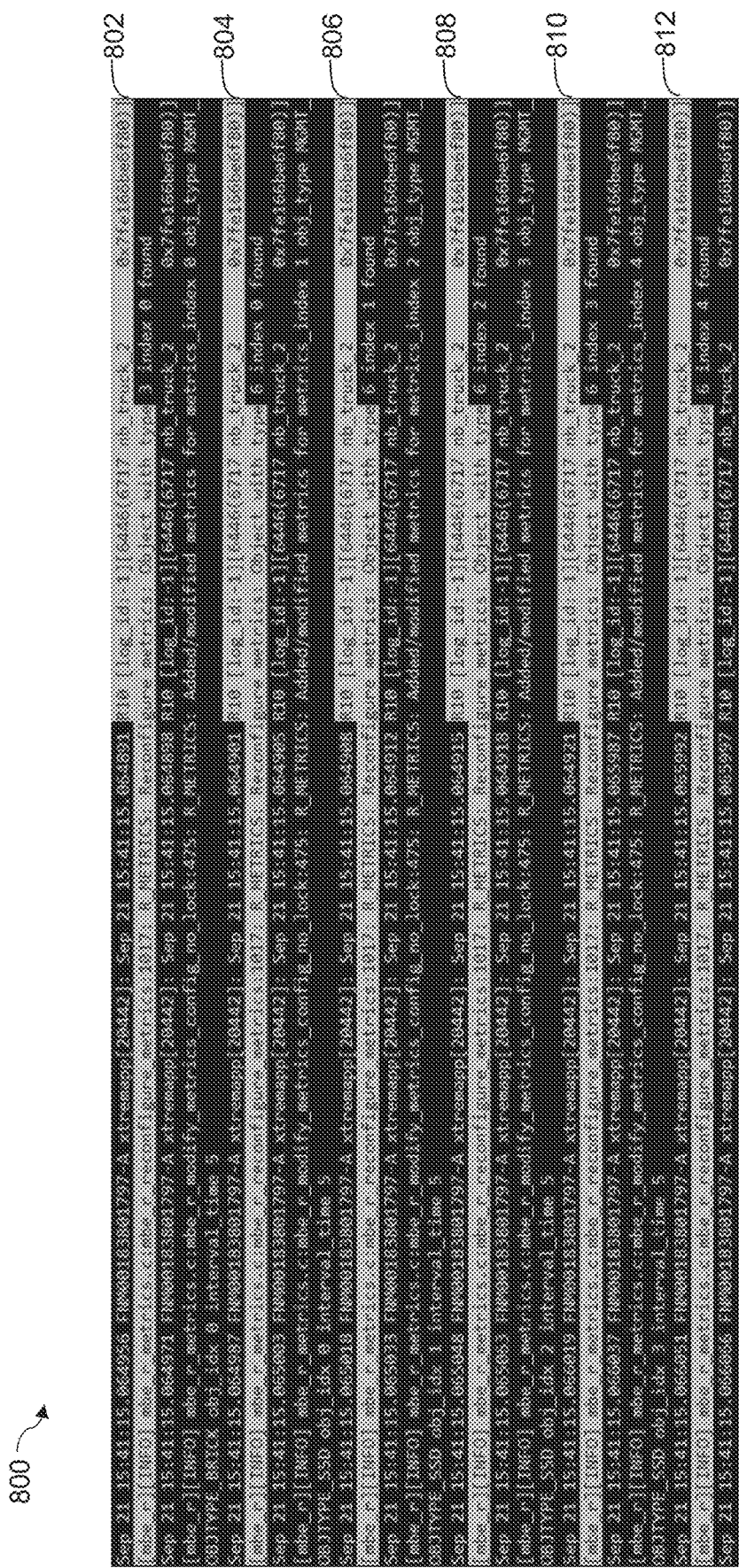
FIG. 8 is a schematic diagram of an example of a duplicate content of a plurality of log entries according to an embodiment of the present disclosure.

FIG. 8 is a schematic diagram 800 of an example of a duplicate content of a plurality of log entries according to an embodiment of the present disclosure. FIG. 8 shows the duplicate content 'R10 [log_id:−1][6446(6717 nb_truck_2 0x7fe166be6f80)][mbe_r][INFO] mbe_r_metrics.c: mbe_r_reconfigure_metrics: 1017: R_METRICS: Reconfigure metrics: Object with type' determined in a plurality of recorded log entries 802, 804, 806, 808, 810, and 812, as displayed in a light-colored area of FIG. 8. Therefore, by de-duplicating the duplicate content of these log entries, the amount of data to be stored may be reduced.

Figure 9:
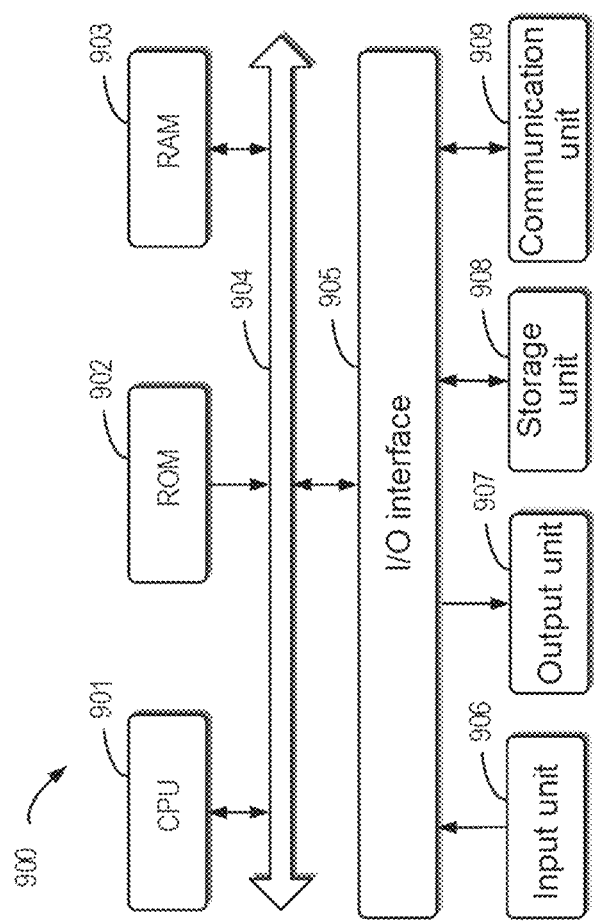
FIG. 9 is a block diagram of an example device suitable for implementing embodiments of the present disclosure.

FIG. 9 is a block diagram of an example device 900 which may be configured to implement embodiments of the present disclosure. The computing device 104 in FIG. 1 may be implemented by the device 900. As shown in the figure, the device 900 includes a central processing unit (CPU) 901 which may perform various appropriate actions and processing according to computer program instructions stored in a read-only memory (ROM) 902 or computer program instructions loaded from a storage unit 908 to a random access memory (RAM) 903. Various programs and data required for the operation of the device 900 may also be stored in the RAM 903. The CPU 901, the ROM 902, and the RAM 903 are connected to one another through a bus 904. An input/output (I/O) interface 905 is also connected to the bus 904.

A plurality of components in the device 900 are connected to the I/O interface 905, including: an input unit 906, such as a keyboard and a mouse; an output unit 907, such as various types of displays and speakers; a storage unit 908, such as a magnetic disk and an optical disc; and a communication unit 909, such as a network card, a modem, and a wireless communication transceiver. The communication unit 909 allows the device 900 to exchange information/data with other devices via a computer network, such as the Internet, and/or various telecommunication networks.

The CPU 901 may perform the various processes and processing described above, such as the method 200 and the processes 400 and 500. For example, in some embodiments, the method 200 and the processes 400 and 500 may be implemented as a computer software program that is tangibly included in a machine-readable medium, such as the storage unit 908. In some embodiments, part or all of the computer program may be loaded and/or installed onto the device 900 via the ROM 902 and/or the communication unit 909. When the computer program is loaded into the RAM 903 and executed by the CPU 901, one or more actions of processes or the method 200 and the processes 400 and 500 described above may be implemented.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated technical improvements, so as to enable persons of ordinary skill in the art to understand the various embodiments disclosed herein.

What is claimed is:

1. A method for processing logs, comprising:
   determining, in a processor-based system and based on a duration of a predetermined number of log entries recently recorded by a log recording component, a target log recording component from a group of candidate log recording components, the candidate log recording components each comprising at least one of a hardware system and a software system associated with the processor-based system and configured to record log entries as corresponding operations are performed by the hardware system and/or the software system;
   determining, in the processor-based system and based on a predetermined number of log entries recently recorded by the target log recording component, a log group comprising a plurality of similar log entries;
   determining, in the processor-based system, a duplicate content among the plurality of log entries in the log group and a distinctive content for each of the plurality of log entries; and
   updating, in the processor-based system, the plurality of log entries by de-duplicating the duplicate content and retaining the distinctive content for each of the plurality of log entries;
   wherein determining the target log recording component from the group of candidate log recording components comprises:
   selecting one candidate log recording component from the group of candidate log recording components;
   acquiring a predetermined number of log entries recently recorded by the candidate log recording component;
   determining a duration of a time period corresponding to the predetermined number of log entries; and
   determining, if determining that the duration is smaller than or equal to a threshold duration, the candidate log recording component as the target log recording component; and
   wherein updating the plurality of log entries comprises:
   automatically triggering a component log merge event responsive to the determining of the candidate log recording component as the target log recording component; and
   executing a similarity check and merge algorithm on one or more hardware processors of the processor-based system responsive to the automatic triggering of the component log merge event, wherein the similarity check and merge algorithm is configured to adaptively delete repeated contents of respective portions of the plurality of log entries in the log group utilizing at least first and second distinct group processing commands executed by the one or more hardware processors.

2. The method according to claim 1, wherein determining the log group including the plurality of similar log entries comprises:
   acquiring the predetermined number of log entries recently recorded by the target log recording component; and
   determining, based on a similarity among the log entries, the log group from the predetermined number of log entries.

3. The method according to claim 2, wherein the predetermined number of log entries are determined as a log set, and determining, based on the similarity among the log entries, the log group from the predetermined number of log entries comprises:
   determining the number of the log entries in the log set;
   selecting, if determining that the number is greater than a threshold number, one log entry from the log set as a reference log entry;
   initializing the log group by using the reference log entry;
   updating the log set by removing the reference log entry from the log set;
   determining a similarity between each log entry in the updated log set and the reference log entry; and
   adding, if determining that the similarity exceeds a similarity threshold, the log entries in the updated log set into the log group.

4. The method according to claim 3, wherein determining the similarity between each log entry in the updated log set and the reference log entry comprises:
   generating adjusted log entries and an adjusted reference log entry by removing timestamps of the log entries and of the reference log entry; and
   determining a similarity between each of the adjusted log entries and the adjusted reference log entry as the similarity between each log entry and the reference log entry.

5. The method according to claim 1, wherein determining the duplicate content among the plurality of log entries in the log group and the distinctive content for each of the plurality of log entries comprises:
   determining the duplicate content by comparing the plurality of log entries; and
   determining a content in each log entry, except for the duplicate content, as the distinctive content for the log entry.

6. The method according to claim 1, wherein determining the duration of the time period corresponding to the predetermined number of log entries comprises:
   determining the duration based on a timestamp of a first log entry in the predetermined number of log entries and a timestamp of a last log entry in the predetermined number of log entries.

7. The method according to claim 1, wherein determining the target log recording component from the group of candidate log recording components comprises:
   determining the target log recording component from the group of candidate log recording components at a predetermined interval.

8. The method according to claim 1, further comprising:
   generating, if determining to display the plurality of log entries, the plurality of log entries by combining the duplicate content with the distinctive content for each of the plurality of log entries respectively; and
   displaying the plurality of log entries.

9. The method according to claim 1, further comprising:
   determining a display format of the plurality of log entries; and
   displaying, if determining that the display format is a hidden format, the duplicate content and the distinctive content for each of the plurality of log entries only.

10. The method according to claim 9, further comprising:
    generating, if determining that the display format is not the hidden format, the plurality of log entries by combining the duplicate content with the distinctive content for each log entry in the plurality of log entries respectively; and
    displaying the plurality of log entries.

11. An electronic device, comprising:
at least one processor; and
at least one memory, coupled to the at least one processor and having instructions stored thereon, wherein the instructions, when executed by the at least one processor, cause the electronic device to perform actions comprising:
determining, in a processor-based system of the electronic device and based on a duration of a predetermined number of log entries recently recorded by a log recording component, a target log recording component from a group of candidate log recording components, the candidate log recording components each comprising at least one of a hardware system and a software system associated with the processor-based system and configured to record log entries as corresponding operations are performed by the hardware system and/or the software system;
determining, in the processor-based system and based on a predetermined number of log entries recently recorded by the target log recording component, a log group comprising a plurality of similar log entries;
determining, in the processor-based system, a duplicate content among the plurality of log entries in the log group and a distinctive content for each of the plurality of log entries; and
updating, in the processor-based system, the plurality of log entries by de-duplicating the duplicate content and retaining the distinctive content for each of the plurality of log entries;
wherein determining the target log recording component from the group of candidate log recording components comprises:
selecting one candidate log recording component from the group of candidate log recording components;
acquiring a predetermined number of log entries recently recorded by the candidate log recording component;
determining a duration of a time period corresponding to the predetermined number of log entries; and
determining, if determining that the duration is smaller than or equal to a threshold duration, the candidate log recording component as the target log recording component; and
wherein updating the plurality of log entries comprises:
automatically triggering a component log merge event responsive to the determining of the candidate log recording component as the target log recording component; and
executing a similarity check and merge algorithm on one or more hardware processors of the processor-based system responsive to the automatic triggering of the component log merge event, wherein the similarity check and merge algorithm is configured to adaptively delete repeated contents of respective portions of the plurality of log entries in the log group utilizing at least first and second distinct group processing commands executed by the one or more hardware processors.

12. The electronic device according to claim 11, wherein determining the log group including the plurality of similar log entries comprises:
acquiring the predetermined number of log entries recently recorded by the target log recording component; and
determining, based on a similarity among the log entries, the log group from the predetermined number of log entries.

13. The electronic device according to claim 12, wherein the predetermined number of log entries are determined as a log set, and determining, based on the similarity among the log entries, the log group from the predetermined number of log entries comprises:
determining the number of the log entries in the log set;
selecting, if determining that the number is greater than a threshold number, one log entry from the log set as a reference log entry;
initializing the log group by using the reference log entry;
updating the log set by removing the reference log entry from the log set;
determining a similarity between each log entry in the updated log set and the reference log entry; and
adding, if determining that the similarity exceeds a similarity threshold, the log entries in the updated log set into the log group.

14. The electronic device according to claim 13, wherein determining the similarity between each log entry in the updated log set and the reference log entry comprises:
generating adjusted log entries and an adjusted reference log entry by removing timestamps of the log entries and of the reference log entry; and
determining a similarity between each of the adjusted log entries and the adjusted reference log entry as the similarity between each log entry and the reference log entry.

15. The electronic device according to claim 11, wherein determining the duplicate content among the plurality of log entries in the log group and the distinctive content for each of the plurality of log entries comprises:
determining the duplicate content by comparing the plurality of log entries; and
determining a content in each log entry, except for the duplicate content, as the distinctive content for the log entry.

16. The electronic device according to claim 11, wherein determining the duration of the time period corresponding to the predetermined number of log entries comprises:
determining the duration based on a timestamp of a first log entry in the predetermined number of log entries and a timestamp of a last log entry in the predetermined number of log entries.

17. The electronic device according to claim 11, wherein determining the target log recording component from the group of candidate log recording components comprises:
determining the target log recording component from the group of candidate log recording components at a predetermined interval.

18. A computer program product comprising a non-transitory computer-readable medium having machine-executable instructions stored therein, wherein the machine-executable instructions, when executed by a machine, cause the machine to perform actions comprising:
determining, in a processor-based system and based on a duration of a predetermined number of log entries recently recorded by a log recording component, a target log recording component from a group of candidate log recording components, the candidate log recording components each comprising at least one of a hardware system and a software system associated with the processor-based system and configured to record log entries as corresponding operations are performed by the hardware system and/or the software system;
determining, in the processor-based system and based on a predetermined number of log entries recently recorded by the target log recording component, a log group comprising a plurality of similar log entries;

determining, in the processor-based system, a duplicate content among the plurality of log entries in the log group and a distinctive content for each of the plurality of log entries; and updating, in the processor-based system, the plurality of log entries by de-duplicating the duplicate content and retaining the distinctive content for each of the plurality of log entries;

wherein determining the target log recording component from the group of candidate log recording components comprises:

selecting one candidate log recording component from the group of candidate log recording components;

acquiring a predetermined number of log entries recently recorded by the candidate log recording component;

determining a duration of a time period corresponding to the predetermined number of log entries; and determining, if determining that the duration is smaller than or equal to a threshold duration, the candidate log recording component as the target log recording component; and wherein updating the plurality of log entries comprises:

automatically triggering a component log merge event responsive to the determining of the candidate log recording component as the target log recording component; and executing a similarity check and merge algorithm on one or more hardware processors of the processor-based system responsive to the automatic triggering of the component log merge event, wherein the similarity check and merge algorithm is configured to adaptively delete repeated contents of respective portions of the plurality of log entries in the log group utilizing at least first and second distinct group processing commands executed by the one or more hardware processors.

19. The computer program product according to claim 18, wherein determining the log group including the plurality of similar log entries comprises:

acquiring the predetermined number of log entries recently recorded by the target log recording component; and determining, based on a similarity among the log entries, the log group from the predetermined number of log entries.

20. The computer program product according to claim 19, wherein the predetermined number of log entries are determined as a log set, and determining, based on the similarity among the log entries, the log group from the predetermined number of log entries comprises:

determining the number of the log entries in the log set;

selecting, if determining that the number is greater than a threshold number, one log entry from the log set as a reference log entry;

initializing the log group by using the reference log entry;

updating the log set by removing the reference log entry from the log set;

determining a similarity between each log entry in the updated log set and the reference log entry; and adding, if determining that the similarity exceeds a similarity threshold, the log entries in the updated log set into the log group.

* * * * *